United States Patent
Abledu

[19]

[11] Patent Number: 6,042,034
[45] Date of Patent: Mar. 28, 2000

[54] FOOD PROCESSING ARRANGEMENT

[76] Inventor: Kodzo Obed Abledu, 2110 Cooley Pl., Pasadena, Calif. 91104

[21] Appl. No.: 09/225,067

[22] Filed: Jan. 4, 1999

Related U.S. Application Data

[63] Continuation-in-part of application No. 09/002,810, Jan. 5, 1998, Pat. No. 5,934,582.
[60] Provisional application No. 60/035,749, Jan. 6, 1997.

[51] Int. Cl.$^7$ ........................................ A47J 44/00
[52] U.S. Cl. ........................................ 241/166; 241/199.7
[58] Field of Search .................................. 241/166, 167, 241/199.7, 199.12

[56] References Cited

U.S. PATENT DOCUMENTS

| | | |
|---|---|---|
| 3,809,322 | 5/1974 | Hirosawa . |
| 3,901,411 | 8/1975 | Bauman . |
| 3,988,114 | 10/1976 | Gorin et al. . |
| 4,046,496 | 9/1977 | Gorin et al. . |
| 4,403,867 | 9/1983 | Duke . |
| 4,772,434 | 9/1988 | Myers . |
| 4,785,727 | 11/1988 | Miyata et al. . |
| 5,524,530 | 6/1996 | Nijzingh et al. . |
| 5,535,665 | 7/1996 | Wong . |
| 5,555,796 | 9/1996 | Kortschot et al. . |
| 5,562,020 | 10/1996 | Shigeshiro . |
| 5,628,247 | 5/1997 | Palumbo et al. . |

FOREIGN PATENT DOCUMENTS 837042  3/1952  Germany .

Primary Examiner—Mark Rosenbaum
Attorney, Agent, or Firm—Don Finkelstein

[57] ABSTRACT

A food processing arrangement for mashing various food products to provide a food of the nature of West African fufu. The food processor has a base unit with a rotation producing structure. A mashing unit having a roller is removably mounted on the base unit and is driven by the rotation producing structure and a bowl is removably mounted on the base unit and the roller of the mashing unit is positioned in the food receiving cavity of the bowl. The roller has driving engagement with the inside surface of the bowl so that the roller rotates the bowl about the bowl axis as the roller rotates about the roller axis. Food in the food receiving cavity is mashed between the inside surface of the bowl and the outer surface of the roller. A scraper is provided to scrape food from the outside surface of the roller and the inside surface of the bowl and is positioned to direct the food so scraped to a predetermined location where the mashed food may be removed from the bowl.

19 Claims, 10 Drawing Sheets

FOOD PROCESSING ARRANGEMENT

REFERENCE TO RELATED APPLICATION

Applicant claims the benefit under 35 USC §119(e), [37 CFR §1.78(a)(3)] of Provisional application Ser. No. 60/035,749 filed Jan. 6, 1997 and applicant claims the benefit herein as a continuation in part of U.S. patent application Ser. No. 09/002,810 filed Jan. 5, 1998, now U.S. Pat. No. 5,934,582 and the teaching and technology thereof are incorporated by reference herein.

BACKGROUND OF THE INVENTION

1. Field of the Invention

This invention relates to the food processing art and more particularly to an electrically powered machine for preparing various types of cooked foods such as fufu, a staple West African food.

2. Description of the Prior Art

In many West African cultures, the preparation of food products has traditionally been accomplished by various cooking processes over open fires. In such processes for the preparation of fufu, a staple of West African cooked food, the major ingredients, such as cassava, plantains, yams, cocoyams and the like are first boiled. The boiled product is then mashed and pounded manually into a paste. A mortar type container holds the product and a wooden or similar pestle is used to accomplish the mashing. The ingredients being pounded are turned by hand during the pounding and mashing process in an attempt to ensure the proper and desired mashing of all lumps of the product.

In comparatively recent times a powdered form of the product, often called fufu powder, has been introduced in an attempt to provide a more rapid and uniform finished product. Such fufu powder is cooked over an open fire to provide the finished fufu food.

With the emigration of many West Africans to the industrialized countries of the world, the opportunity to manually pound fufu has decreased. Further, the availability of electricity to power food processing machines has made it desirable to prepare fufu and other traditional West African foods using the labor saving electrically powered devices. The preparation of the traditional foods using the electrically powered devices also can provide a more consistent finished food product. However, the present invention may also be practiced by manually operating the food processor for those persons desiring to have a "feel" for the food product being processed or during use in those locations where electricity is not available as in wilderness camping and the like.

Thus, there has been a need for electrically powered or manually operated food processing machines that will enable the preparation of the traditional West African, and other, food products.

SUMMARY OF THE INVENTION

It is an object of the present invention to provide an electrically powered or manually operated food processing arrangement.

It is another object of the present invention to provide an electrically powered or manually operated food processing arrangement capable of preparing traditional food products.

It is another object of the present invention to provide an electrically powered or manually operated food processing arrangement for preparing traditional West African food products such as fufu.

The above, and other objects of the present invention are achieved, according to a preferred embodiment thereof in the electrically powered embodiment of the present invention, by providing a base unit having a motor and drive system in a force bearing framework. A mixing bowl is detachably and rotatably mounted on the base and a mashing unit is positionable in the bowl and operatively connected to the drive system. The mashing unit has a roller having rounded surfaces that are tangential to the inner surface of the bowl and other surfaces, such as flat surfaces to provide an uneven aspect for facilitating the initial mashing of the boiled ingredients which, in this embodiment of then present invention, are to be made into fufu. The roller is in tangential or otherwise driving engagement with the bowl. As the roller is rotated by the drive unit, the roller rotates the bowl by frictional engagement therewith and the ingredients are mashed between the roller and the inner surface of the bowl. The axial length of the roller is shorter than the inner height of the bowl to reduce spillage.

A scraper unit is mounted on the mashing unit in food clearing relationship to both the inner surface of the bowl and the surfaces of the roller. The scraper unit has two legs. One leg scrapes food from the roller and the other leg scrapes food from the inner surface of the bowl. The two legs of the scraper unit are positioned so that food removed from both the surface of the roller and from the surface of the bowl are directed to the space between the legs of the scraper.

The base unit, in this embodiment, is provided with an electric motor which rotates a drive shaft connected to the roller of the mashing unit. The base unit also rotatably supports the bowl on a base plate portion and has a plurality of rotating discs or roller bearings engaging the outer surface of the bowl. The force of the roller on the bowl keeps the bowl in contact with the roller bearings as the roller of the mashing unit is rotated by the drive shaft.

In a manually operated embodiment of the present invention, the electric motor is eliminated and a handle is operatively connected to the mashing unit. A gear drive train may, if desired, be connected between the mashing unit and the handle to provide either a desired speed increase or speed reduction for the rotation of the roller in the mashing unit.

BRIEF DESCRIPTION OF THE DRAWINGS

The above and other objects of the present invention may be more fully understood from the following detailed description taken together with the accompanying drawing wherein similar reference characters refer to similar elements throughout and in which.

DESCRIPTION OF THE PREFERRED EMBODIMENTS

Figure 1:
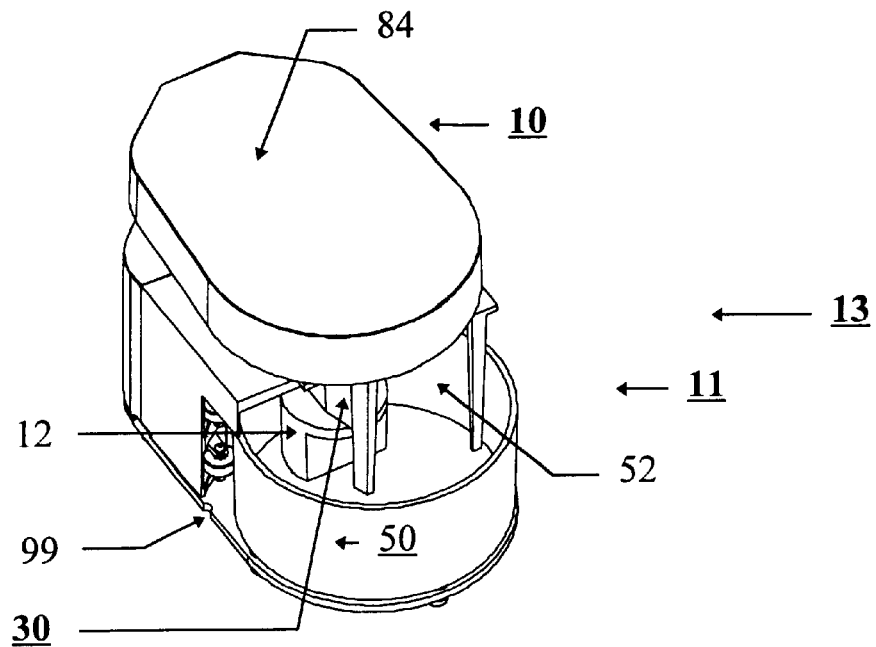
FIG. 1 is a perspective view an electrically powered food processing machine according to the principles of the present invention.
Figure 2:
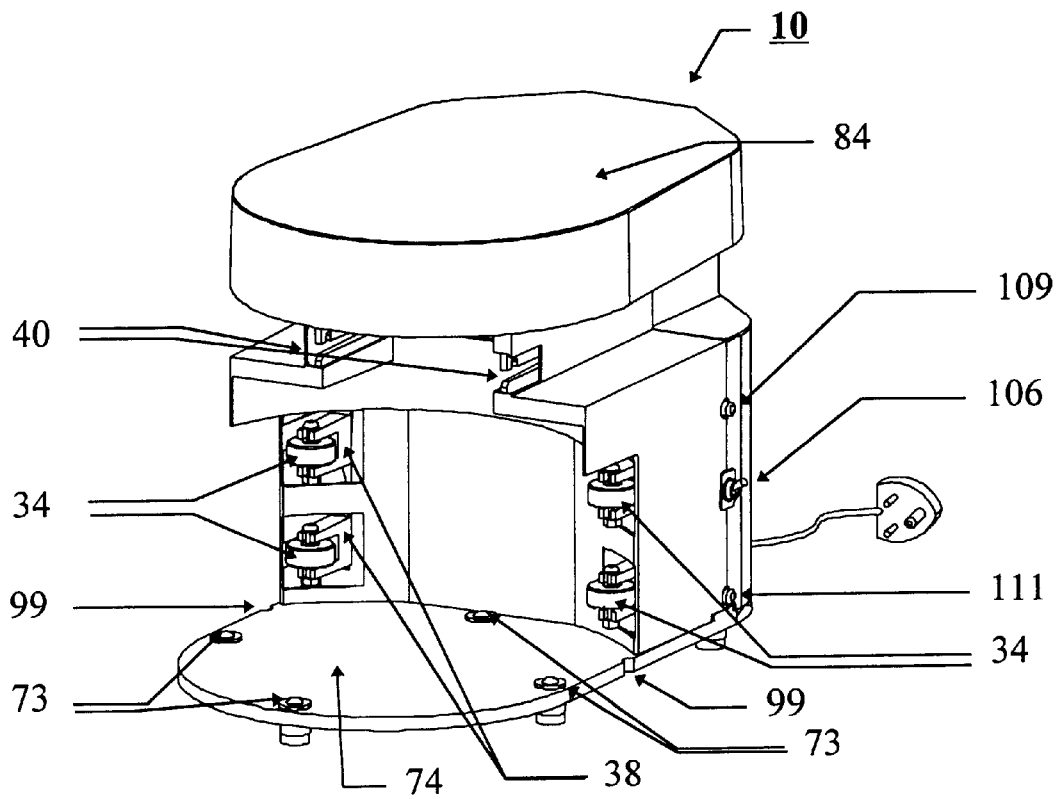
FIG. 2 is a perspective view of a base unit useful in the practice of the present invention.
Figure 3:
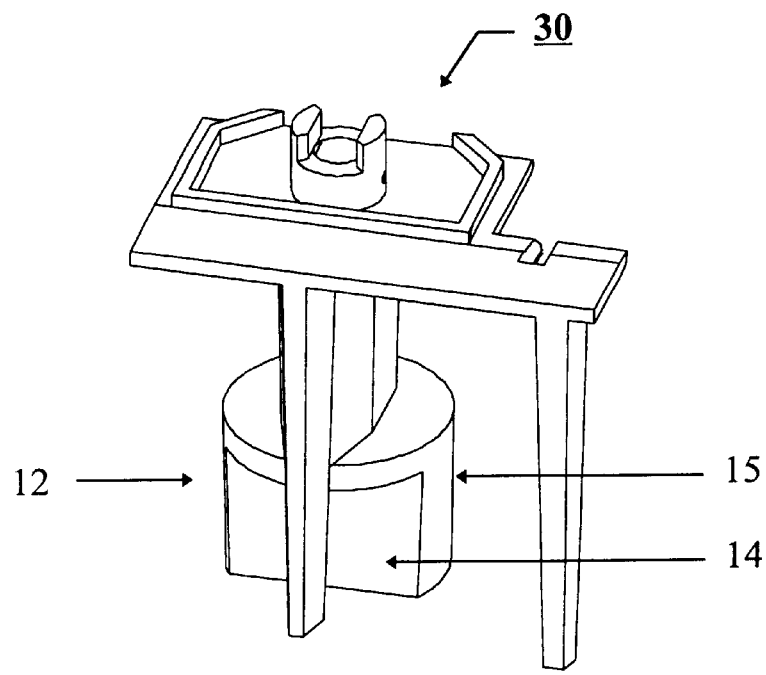
FIG. 3 is a perspective view of a mashing unit useful in the practice of the present invention.
Figure 4:
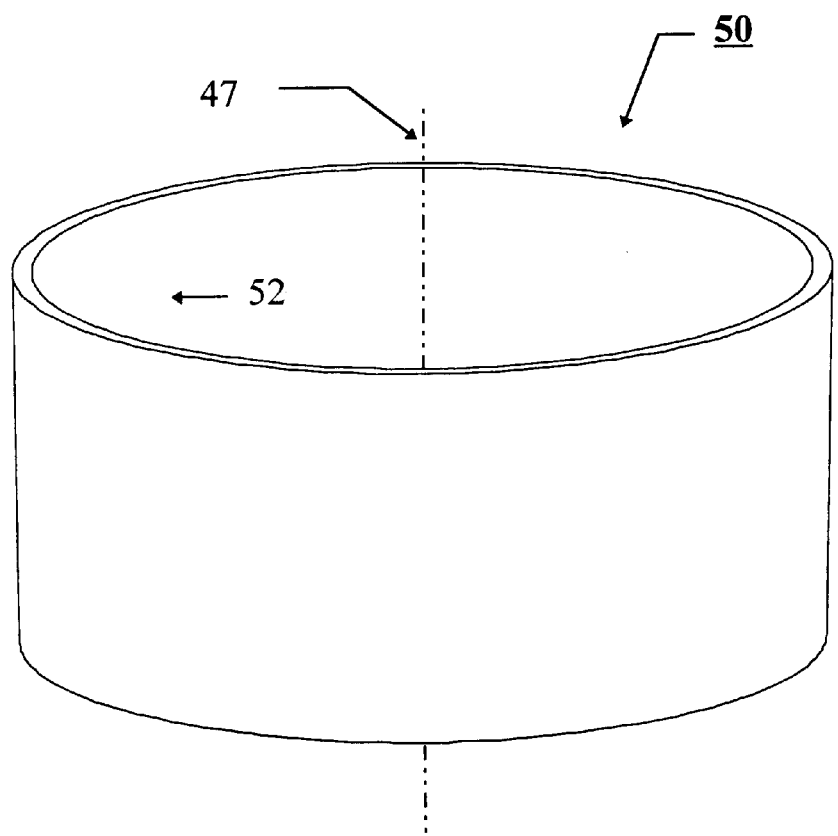
FIG. 4 is a perspective view of a bowl useful in the practice of the present invention.

Referring now to the drawing there is illustrated an embodiment, generally designated 11, of a food processing machine 13 according to the principles of the present invention. The food processing machine 13 is generally comprised of a base unit 10, as shown in perspective in FIG. 2, a masher unit 30 as shown in perspective on FIG. 3 and a bowl 50 as shown in perspective on FIG. 4 which are detachably mountable together for operation and may be easily separated for cleaning, servicing or the like.

Figure 5:
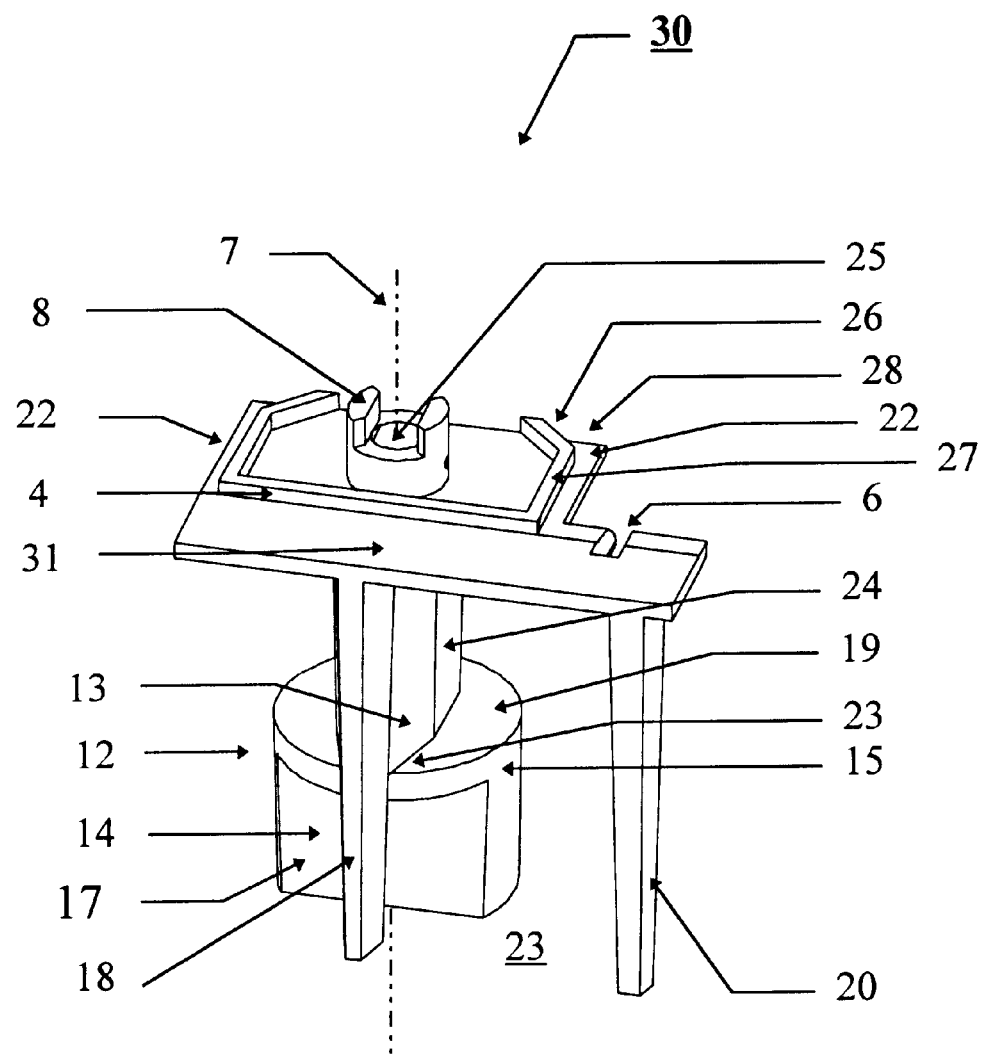
FIG. 5 is a detailed perspective view of the mashing unit.

FIG. 5 illustrates, in a detailed perspective view, the mashing unit 30 of the embodiment 11 of the present invention. As shown on FIG. 5, the mashing unit 30 has a rigid frame generally indicated at 31 and a roller 12 rotatably mounted on the rigid frame 31 for rotation about an axis 7. The roller 12 has an outer surface having a first portion with a curved face 15 having a first preselected curvature that is adapted to bear against the inside surface 52 of bowl 50 and is tangential thereto. The roller 12 also has a second portion 17 that is an uneven portion such as flat surface 14 to facilitate the initial mashing of the food ingredients (not shown) into smaller bits. In preferred embodiments of the present invention, a substantial portion of the roller 12 is tangential to the surface 52 of bowl 50. Multiple flat surfaces could be included on the roller 12 as may be desired for some applications. For the preparation of fufu, the food ingredient placed into the bowl 50 may be boiled cassava, plantains, yams, cocoyams or the like.

As the roller 12 is rotated the bowl 50 is rotated about an axis 47 (FIG. 4) due to the frictional driving engagement between the roller 12 and the bowl 50.

Two scrapers 18 and 20 are also provided on the mashing unit 30. Scraper 18 removes food adhering to the roller 12 and scraper 20 removes food from the inside surface 52 of bowl 50. The lower edge 23' of the scraper 18 removes any food product that oozes to the top of the roller 12. The slanted surface 13 in the outer body of the sleeve bearing 24 directs this food into the bowl. In preferred embodiments of the present invention, the two scrapers 18 and 20 are placed so that the food removed from the roller 12 and/or the inside surface 52 of the bowl 50 are directed into the space 23 between the scrapers 18 and 20.

Figure 6A:
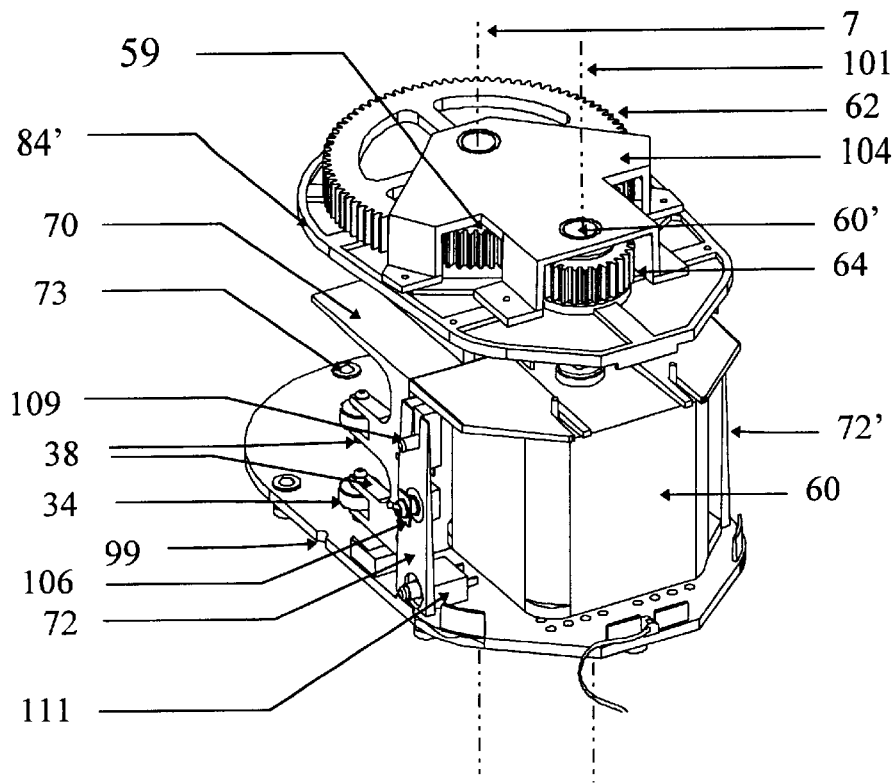
FIGS. 6A and 6B are perspective views of the base unit.
Figure 6B:
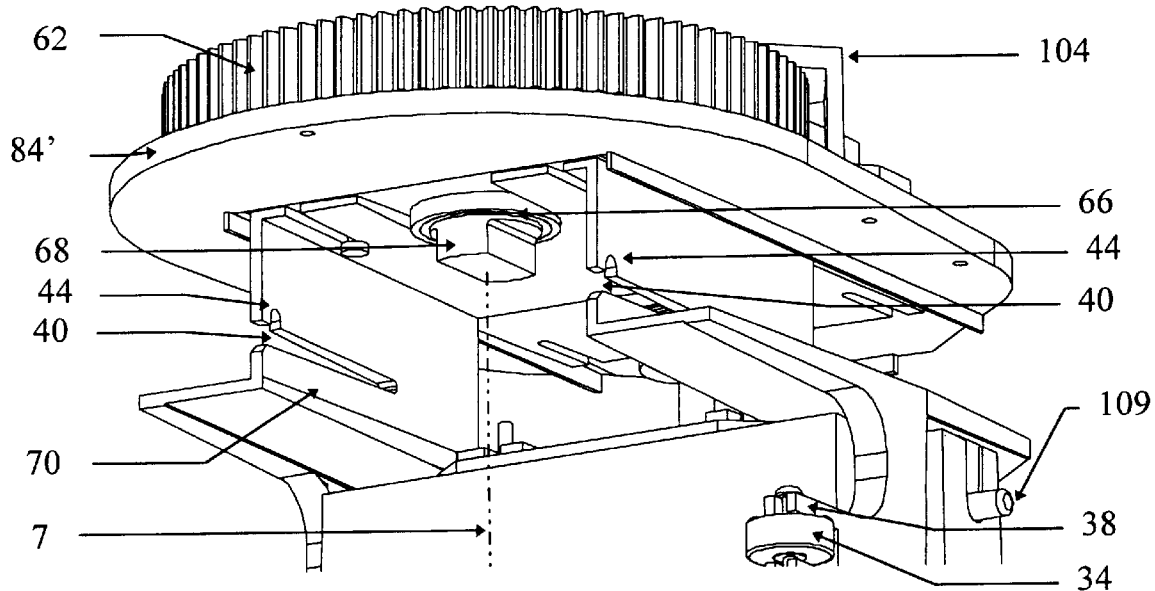

In preferred embodiments of the present invention the mashing unit 30 is removably mounted on the base unit 10. Referring now to FIGS. 6A and 6B as well as FIG. 5, the rigid frame 31 of the mashing unit 30 is provided with a mounting plate 22 which fits into parallel slots 40 in a rigid framework which may be a metal framework 70 of the base unit 10. A sleeve bearing 24 is mounted on the plate 22 and extends downwardly therefrom. Shaft 25 which rotates the roller 12 extends through sleeve bearing 24. Self lubricating polymer bearings are used as liners in sleeve bearing 24. The plate 22 transmits the forces associated with the mashing of the food between the roller 12 and the surface 52 of the bowl 50 to the metal framework 70 of the base unit 10 into which the plate 22 is inserted. The ledge 27 of plate 22 is preferably recessed as shown at 26 and chamfered as shown at 28 to facilitate the insertion of plate 22 into slots 40 of the base unit 10. A shoulder 4 on plate 22 is aligned with notches 44 in the framework 70 for the condition of the mashing unit 30 fully inserted into the slots 40 of the framework 70. A restraining key 80 (FIG. 10B) is inserted into the notches 44 to restrain the mashing unit 30 therein and a loop end 81 of the key 80 is positioned in a detent or aperture 6 in the mashing unit 30 to prevent the key 80 from falling out of engagement with the mashing unit 30 and the base unit 10 during operation.

The bowl 50 is positioned on ball transfers 73 in a base plate 74 of the rigid framework 70 of the base unit 10 and bears against side roller bearings 34. The side roller bearings 34 are mounted in arms 38 extending from the metal framework 70 of the base unit 10. The side roller bearings 34 provide the structure for the reaction to the forces generated as the roller 12 crushes food against the inside surface 52 of the bowl 50 during the operation of the food processor 11 as well helping to keep the bowl 50 properly aligned during operation.

The side roller bearings 34 could, in another embodiment of the present invention, be replaced by rollers inside the bowl 50 to maintain the bowl 50 in place. Such inside rollers would be placed diametrically opposite the roller 12 to provide the reaction to the forces generated during the food crushing operation of the roller 12. More than two such inside roller bearings could be utilized and would be placed around the circumference of the bowl 50 in such a manner to provide the reaction to the food crushing forces generated during operation as well as to prevent tipping of the bowl 50. Similarly, in yet another embodiment of the present invention, the bowl 50 could be fixed and the roller 12 could be driven to revolve around the periphery of the bowl 50 as well as rotate about its own axis to provide the crushing of the food between the inside surface 52 of the bowl 50 and the roller 12.

The present invention may be manually operated or may be driven by a powered motor such as an electric motor in those embodiments where electrical power is available. FIG. 6A illustrates the embodiment of the present invention in which an electric motor is utilized as the driving source.

Figure 7:
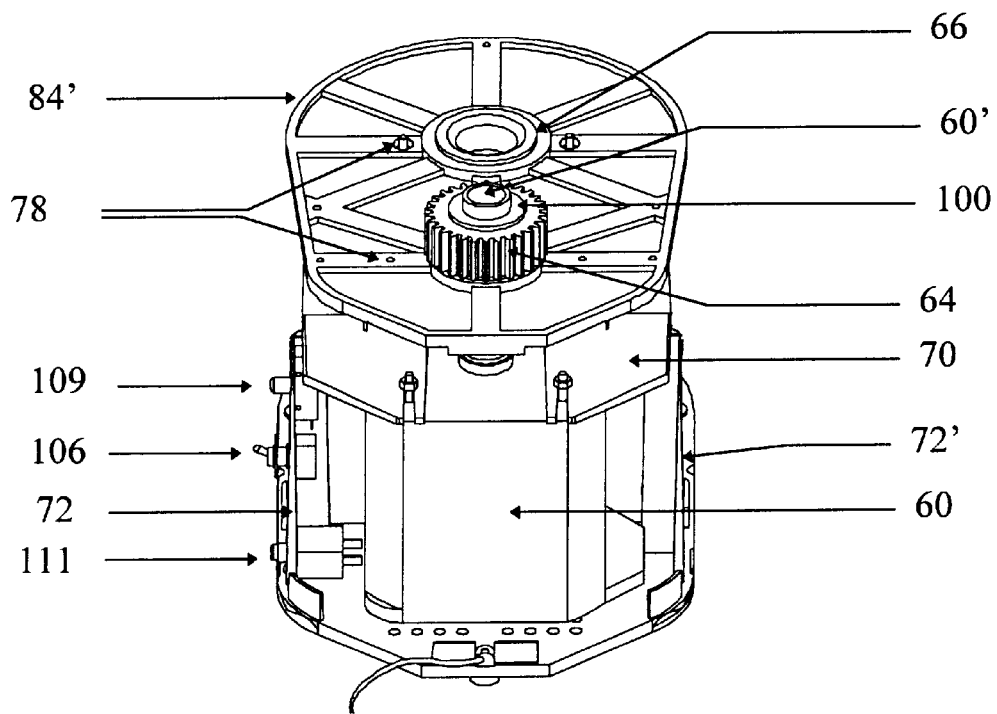
FIGS. 7 and 8 are perspective views of the gear housing of the base unit.
Figure 8:
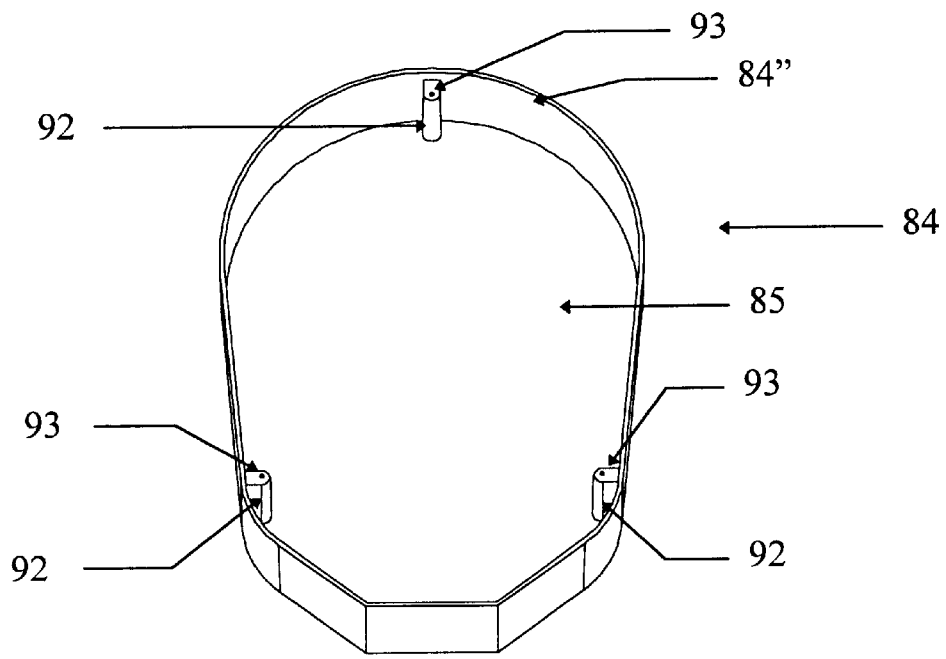

As shown in FIG. 6A, an electric motor 60 is mounted on the metal framework 70 and drives a drive train which in the embodiment 11 is a speed reduction gearing arrangement 59 comprised, in this embodiment 11 of the present invention, of gears 62 and 64. The gears 62 and 64 could, if desired, be replaced by belts, chains, friction drives, or other drive mechanisms. Since the electric motor 60 generally operates at higher speeds than desired for the rotation of the roller 12, the gears 62 and 64 provide a speed reduction, and consequent torque increase, for the rotation of the drive lug 68. A coupling or connection member 8 (FIG. 5), which may be a clevis type coupling, of the roller 12 removably fits on the drive lug 68 for the desired rotation of the roller 12 about the axis 7. If desired, a self lubricating polymer sleeve 66 may be utilized in the aperture in the metal framework 70 through which the output shaft of the gear 62, which is connected to drive lug 68, passes. The gearing arrangement 59 is housed in an enclosure 84 coupled to the metal framework 70 in regions adjacent the top portion thereof by a plurality of fasteners 78 as shown on FIG. 7. FIG. 8 depicts the underside surface 85 of the upper portion 84" of the housing 84. Bosses 92 extend from the underside 85 of the upper portion 84" of housing 84 and are provided with screw accepting apertures 93 therethrough. Screws (not shown) may be utilized in the screw accepting apertures 93 for coupling the upper portion 84" of housing 84 to the lower portion 84' of housing 84. The bosses 92 also bear against the lower portion 84' of housing 84 to add rigidity to the assembled structure. Similarly, the motor shaft 60' extends through another self lubricating bearing 65 (not shown) in the metal framework 70 to reduce any tendency of the gear 64 to wobble in those embodiment where the motor shaft 60' of motor 60 has a great axial length. A bracing structure 104 is provided to aid in maintaining the proper center spacing of the gears 62 and 64. The bracing structure 104 has holes into which sleeve bearings 100 and the ends of the gear shafts 62 and 64 fit. Two columns 72 and 72' extend vertically upwardly from the base plate 74 and the metal framework 70 coupled to the two columns 72 and 72'. The column 72 is provided with apertures and control switches 106, 109 and 111 are mounted in the apertures to provide control of the motor 60.

In operation, food to be mashed is placed in the bowl 50 and the bowl 50 is placed on the base plate 74. The switch 106 is turned to the ON position thereof and the motor 60 rotates the motor shaft 60' about axis 101. The gear 64 is rotated by the motor shaft 60' and drives the gear 62 which is coupled to the coupling 8 on the roller 12 through drive lug 68. The roller 12 is rotated and drives the bowl 50 through frictional engagement therewith. The rotation of the roller 12 forces food against the inside surface 52 of bowl 50 and mashes the food product.

Figure 9:
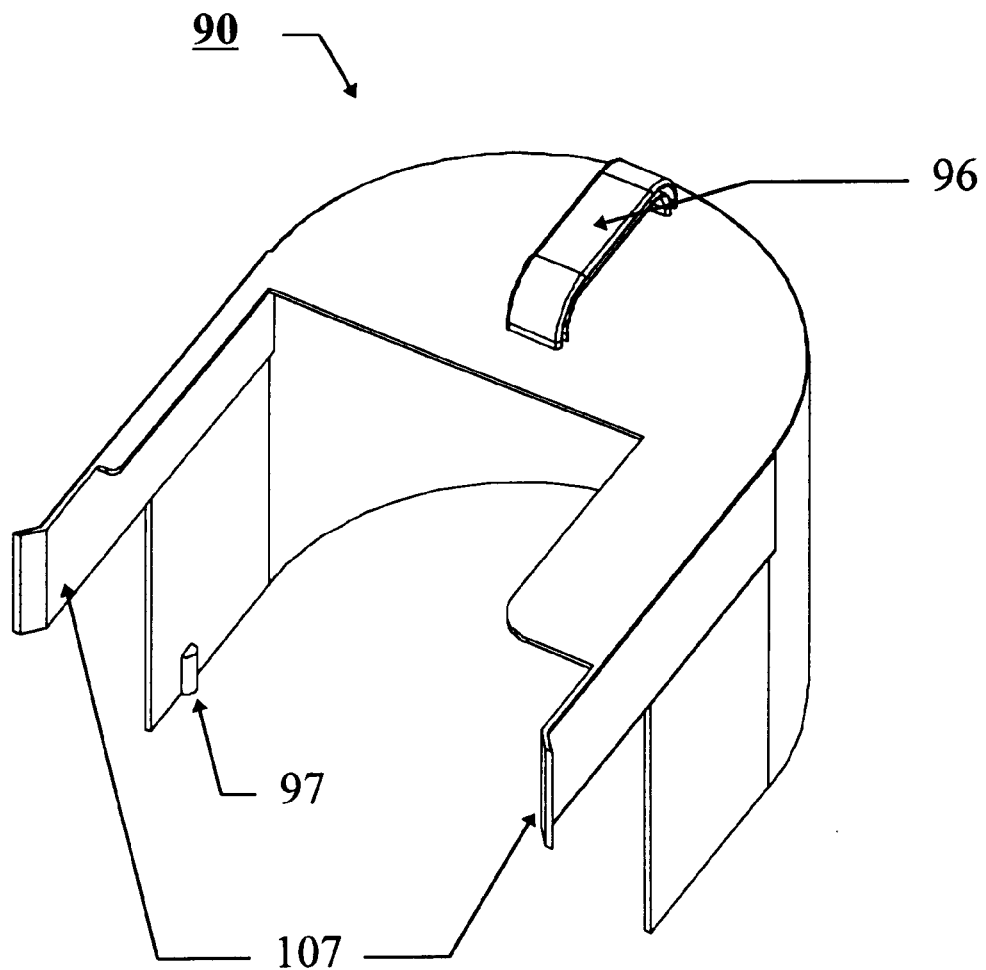
FIG. 9 is a perspective view of a cover useful in the practice of the present invention.

A cover 90 (FIG. 9) is provided to fit over the bowl 50 both during operation of the embodiment 11 as well as when the food processing arrangement 13 is stored. A handle 96 may be provided on the cover 90. For safety, in preferred embodiments of the present invention, the bowl cover 90 is required to be in place for operation of the food processor. The flap 107 of the bowl cover 90 turns "ON" a snap action switch 109 which is connected in series with the motor 60 in order to enable the operation thereof. An overload switch 111 cuts off power to the motor 60 in the event there is a jam or an overload. Projections 97, only one of which is shown most clearly in FIG. 9, there being another projection on the side of the bowl cover 90 opposite from the projection 97 shown, fit into detents 99 (FIG. 2) to lock the cover 90 into place.

Figure 10A:
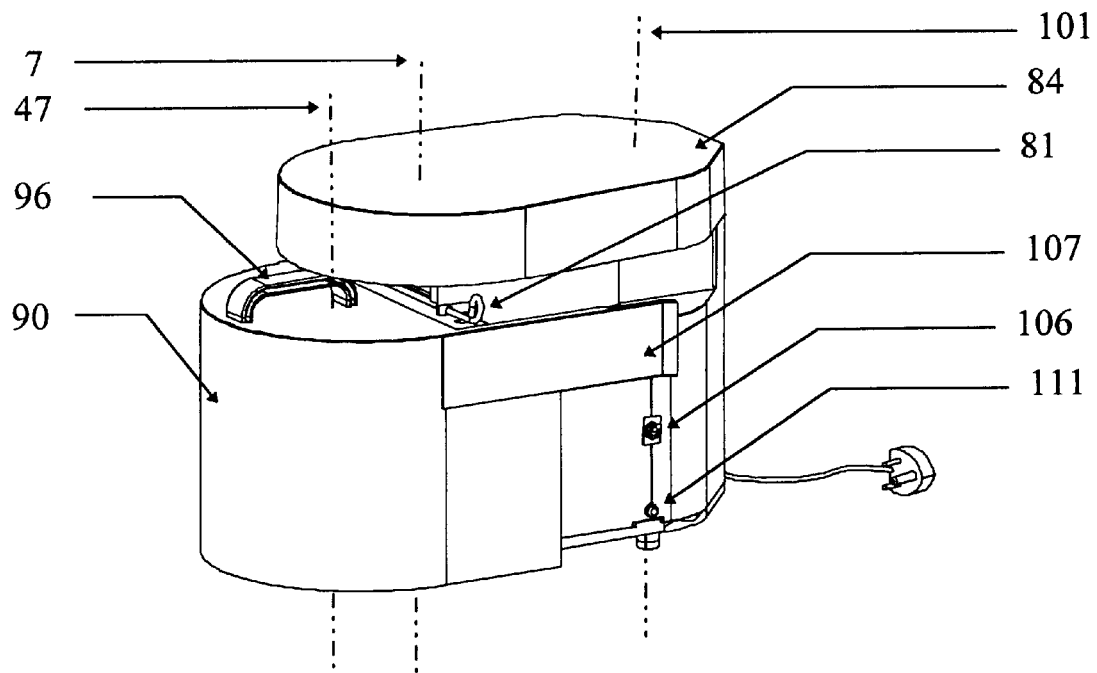
FIGS. 10A and 10B illustrate the food processor of FIG. 1 with the cover installed and without the cover installed.
Figure 10B:
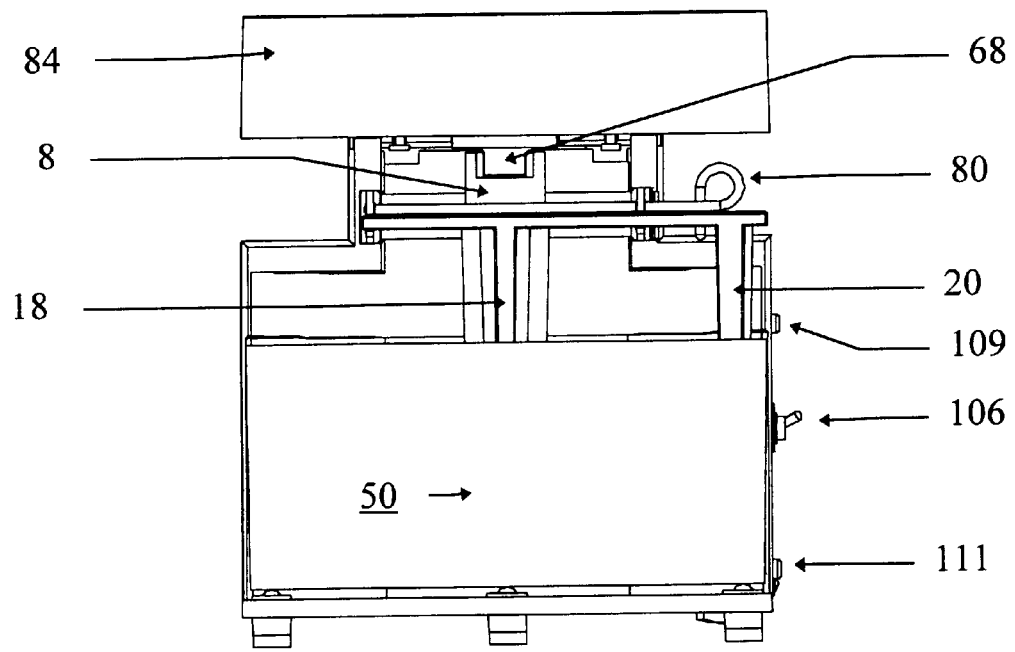
Figure 11:
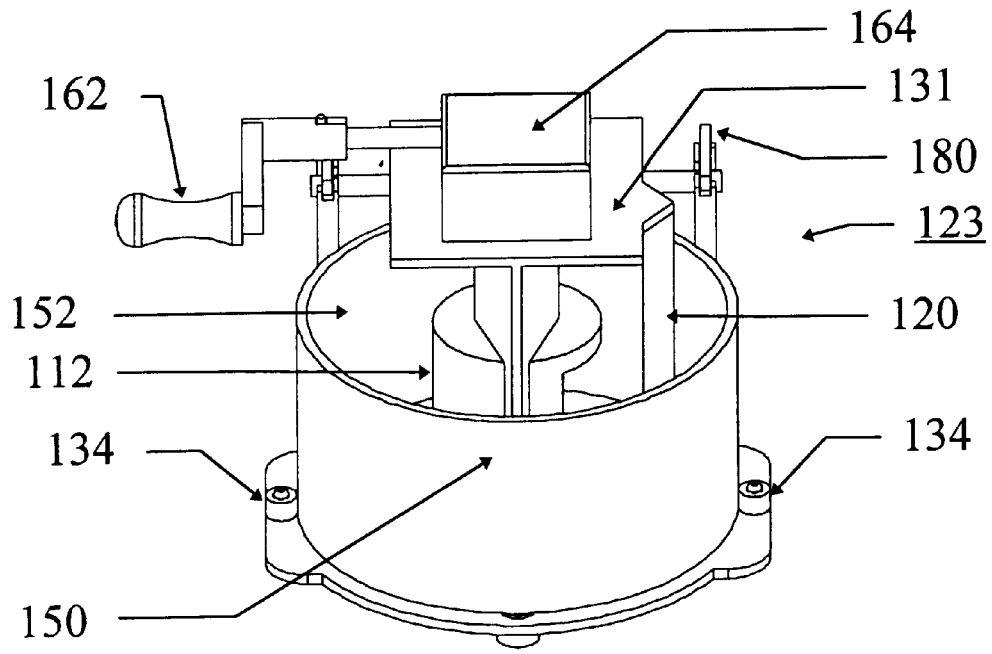
FIG. 11 is a perspective view of a manually operated food processor as seen from the front.
Figure 12:
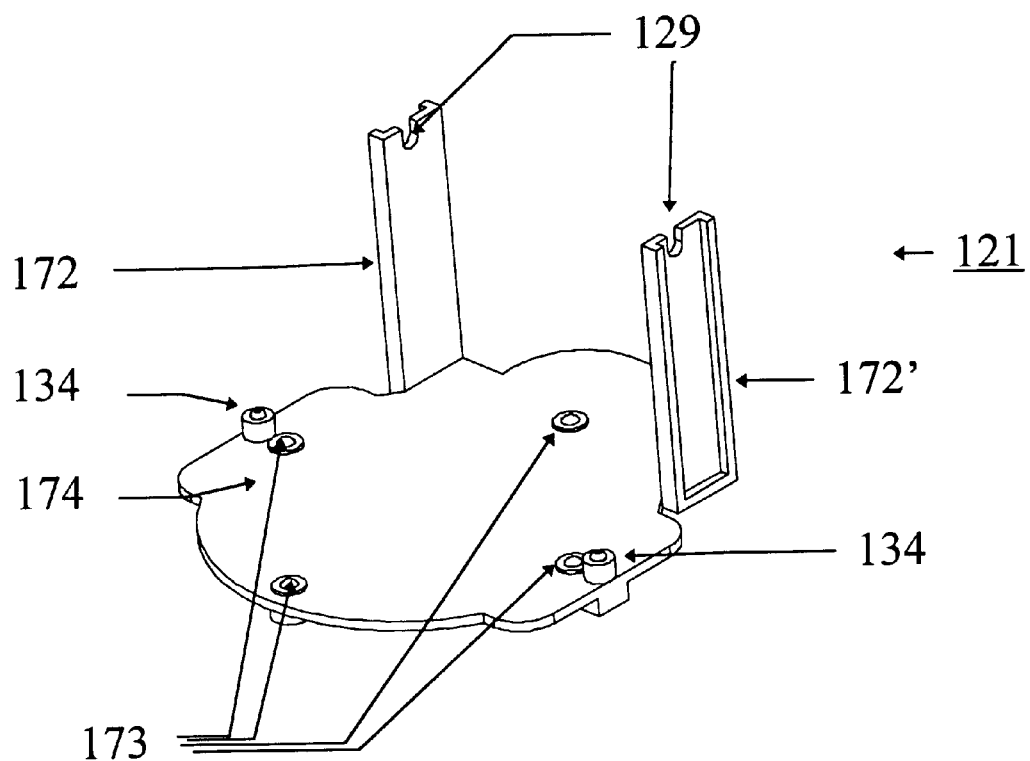
FIG. 12 is a perspective view of the base unit of the embodiment of the manually operated food processor shown in FIG. 11.
Figure 13:
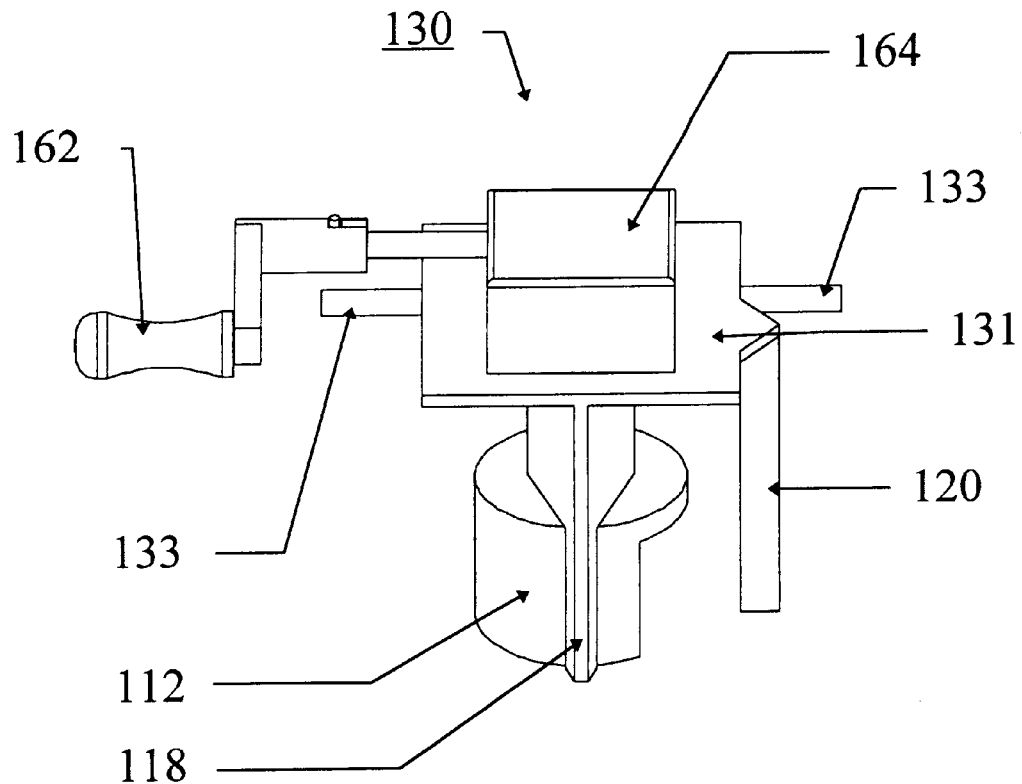
FIGS. 13 and 14 are perspective views of the mashing unit used in the manually operated food processor of FIG. 11; and, FIGS. 15 and 16 are perspective views of the manually operated food processor of FIG. 11 from the back and side, respectively.
Figure 14:
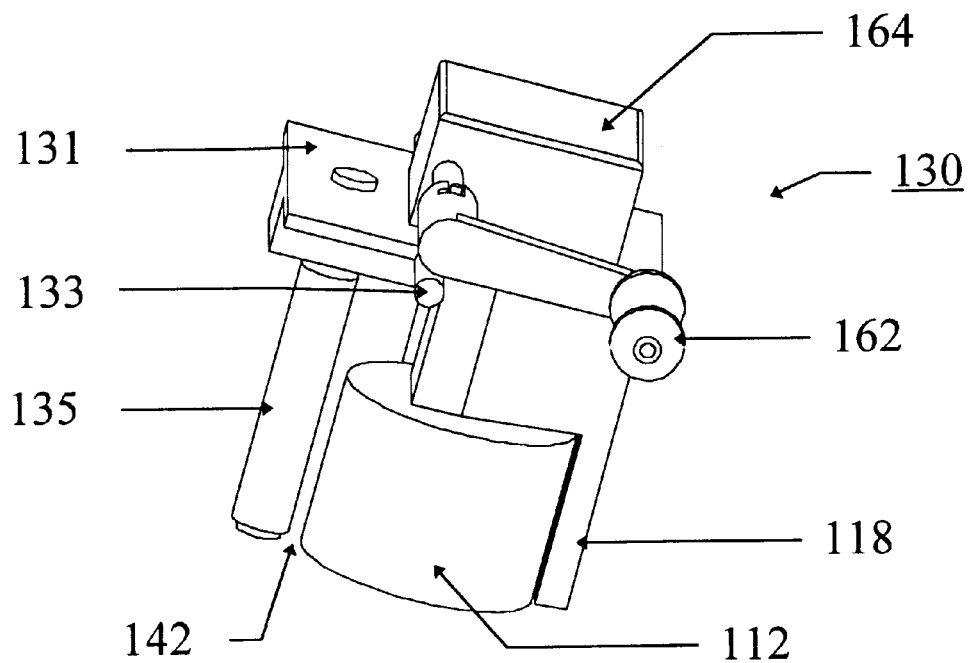

FIG. 10A illustrates the food processing arrangement 13 in the assembled condition with the cover 90 in place over the bowl 50. FIG. 10B illustrates the food processing arrangement 13 without the bowl cover 90 in place. The axis of rotation 101 of the motor shaft is offset from the axis of rotation 7 of the roller 12 which is also offset form the axis 47 of the rotation of the bowl 50. The rotational rate of the motor 60 is faster than the rotational rate of the roller 12 which, in turn, is faster than the rotational rate of the bowl 50.

In embodiment 10, an electric motor 60 provides the rotation producing means for the desired rotation of the bowl during the food mashing process. However, other rotation producing means may also be incorporated into the present invention as may be desired for particular applications. For example, a manually operated rotation producing means may be utilized.

FIGS. 11 through 16 illustrate an embodiment 123 of the present invention having a manually operated rotation producing means for a food processing arrangement. The embodiment 123 shown on FIG. 11 consists of a base 121 (FIG. 12), a mashing unit 130 ( FIGS. 13 and 14) and a bowl 150.

The base unit 121 has a support surface 174 in which there are provided ball transfers 173 and side rollers 134. The base unit 121 also is provided with a rigid framework comprising vertically oriented rigid support members 172 and 172'. The rigid support members 172 and 172' have aligned slots 129 therein at an upper end thereof. The mashing unit has two rollers 112 and 135 and two scrapers 118 and 120. The mashing unit also has a drive train comprising the crank 162 and gear box 164 operatively connected to the roller 112 for providing the rotation of the roller 112 upon rotation of the crank 162. Support trusses 133 are coupled to a body member 131 of the mashing unit 130 and the scrapers 118 and 120 are also coupled to the body member 131 of mashing unit 130. The scrapers 118 and 120 extend downwardly from the body member 131. The body member 131 also acts as a connecting member to couple the roller 112 to the gear box 164 of the drive train by the support of the gear box 164 thereon.

The bowl 150 is inserted in the space 142 (FIG. 14) between the two rollers 112 and 135 and the roller 112, which is uneven in the peripheral surface thereof and may be similar in configuration to the roller 12 described above, inside the bowl 150 and the roller 135 outside the bowl 150 to absorb all the reaction forces that result from mashing food inside the bowl. The bowl 150 is simultaneously tangential to both rollers 112 and 135. Rotation of the roller 112 rotates the bowl 150 through frictional contact of the roller 112 with the inside surface 152 of the bowl 150. The food to be processed (not shown) is forced between the roller 112 and the inside surface 152 of the bowl 150 as the roller 112 is rotated.

Figure 15:
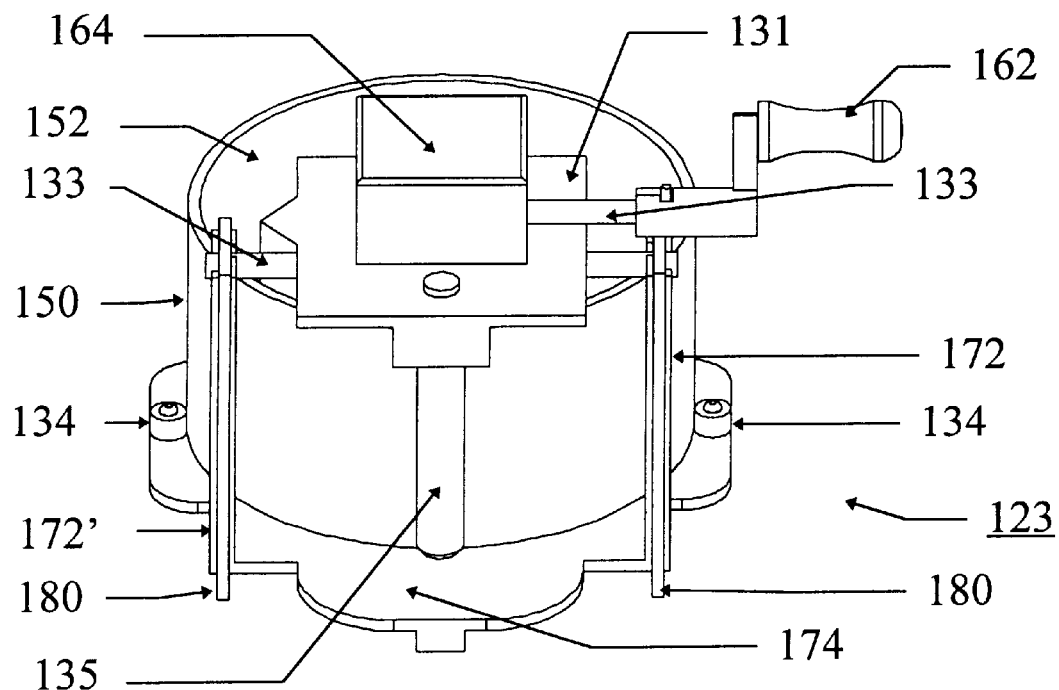
Figure 16:
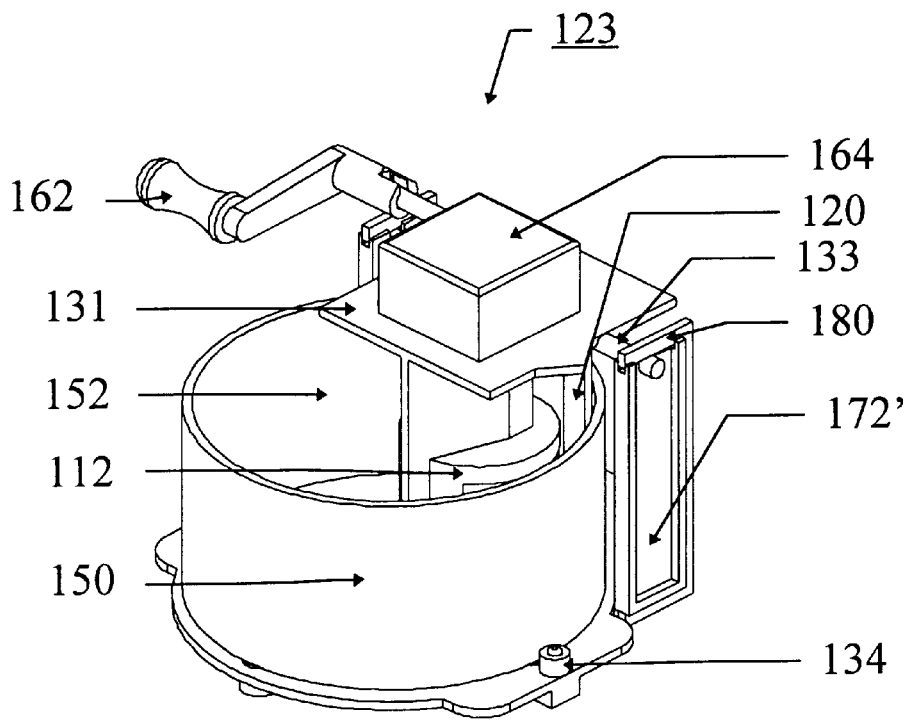

FIG. 15 is a view of the embodiment 123 showing the roller 135 outside the bowl 150. Scrapers 118 and 120 remove food from the roller 112 and the inner surface 152 of the bowl 150, respectively, during the mashing process. FIG. 16 shows a perspective view of the embodiment 123.

The roller 112 is rotated through a drive train comprising a gear box 164 by turning a crank handle 162. Support trusses 133 on the body 131 of the mashing unit 130 fit into slots 129 in supporting columns 172 and 172' of the base unit 121. The trusses 133 are clamped by C-clamps 180 onto the base unit 121 to keep the mashing unit 130 in place during operation.

The bowl 150 rotates on ball transfers 173 embedded into the surface 174 of base unit 121. Side rollers 134 keep the bowl 150 in place as it rotates during the mashing process.

This concludes the description of the preferred embodiments of the present invention. Those skilled in the art may find many other variations and adaptations of the present invention and all such variations and adaptations falling within the true scope and spirit of the invention herein are intended to be covered by the appended claims.

What is claimed is:

1. An improved food processing arrangement comprising, in combination:
   a base unit having:
      a rotation producing means;
      a drive train operatively connected to said rotation producing means for transmitting rotary motion thereof about a first axis;
   a mashing unit removably mountable on said base unit and having:
      a frame member;
      a roller having an outer surface and mounted on said frame member for rotation about a second axis;
      a connection member coupled to said roller for operatively connecting said roller to said drive train for rotation of said roller about a second axis at a second predetermined rotational rate;

a scraper member having a first portion in food removing relationship to said roller for removing food from the outside surface of said roller;

a bowl movably and detachably mounted on said base unit and having:
an outside surface;
an inside surface defining a food receiving cavity and said inside surface in food mashing relationship to said roller for the condition of said roller rotating about said second axis;

said roller rotating said bowl about a third axis at a third predetermined rotational rate for the condition of said roller rotating about said second axis, whereby food in said food receiving cavity of said bowl is mashed between said outside surface of said roller and said inside surface of said bowl.

2. The arrangement defined in claim 1 and further comprising:
a mounting plate on said frame member of said mashing unit;
said base unit having a rigid framework, and said rigid framework having first walls defining slots therein, and said mounting plate of said mashing unit removably mountable in said slots; and,
key member removably mountable on said base unit and slidably engaging said rigid framework of said base unit and said mounting plate of said mashing unit for detachably retaining said mashing unit on said base unit.

3. The arrangement defined in claim 2 and further comprising:
a detent on said mashing unit for removably restraining said key on said base unit.

4. The arrangement defined in claim 1 wherein:
said outer surface of said roller has a first portion and a second portion;
said first portion of said outer surface of said roller having a first preselected curvature and said first preselected curvature selected to provide substantially tangential contact of said first portion of said roller with said inside surface of said bowl; and
said second portion of said outer surface of said roller having a geometric configuration other than said first preselected curvature.

5. The arrangement defined in claim 4 wherein:
said geometric configuration of said second portion of said outer surface of said roller is planar.

6. The arrangement defined in claim 1 wherein:
said rotation producing means comprises a motor;
said base unit further comprising:
a rigid framework, and said motor mounted on said rigid framework;
a base plate;
a plurality of side roller bearings connected to said rigid framework in a predetermined spaced array and spaced from said base plate;
said bowl is rotatably supported on said base plate of said base unit and said outside surface of said bowl engaging said side roller bearings whereby said side roller bearings provide reaction to the forces generated by said roller mashing food against said inside surface of said bowl.

7. The arrangement defined in claim 1 wherein:
said scraper further comprises:
a second portion in food removing relationship to said inside surface of said bowl for removing food therefrom for the condition of said bowl rotating.

8. The arrangement defined in claim 1 wherein:
said drive train of said base unit further comprises:
a first gear connected to said drive shaft of said motor;
a second gear mounted in gear engaging relationship to said first gear and rotated thereby, and said second gear having a gear shaft and said gear shaft having a drive lug thereon;
said connection member of said roller of said mashing unit comprising a clevis member for detachable coupling to said drive lug; and
said gear shaft of said second gear of said drive train rotating about said second axis.

9. The arrangement defined in claim 8 wherein:
said first axis is offset from said second axis and offset from said third axis.

10. The arrangement defined in claim 9 and further comprising:
a rigid bracing member extending between said first gear and said second gear for maintaining a predetermined spacing therebetween.

11. The arrangement defined in claim 1 wherein:
plurality of ball transfers mounted in said base plate; and,
said bowl mounted on said ball transfers for rotation thereon.

12. The arrangement defined in claim 11 wherein:
said rotation producing means comprises a motor;
said base unit further comprising:
a rigid framework, and motor mounted on said rigid framework;
a base plate;
a plurality of side roller bearings connected to said rigid framework in a predetermined spaced array and spaced from said base plate;
said base rollers of said bowl rotatably support said bowl on said base plate of said base unit and said outside surface of said bowl engaging said side roller bearings whereby said side roller bearings provide reaction to the forces generated by said roller mashing food against said inside surface of said bowl.

13. The arrangement defined in claim 12 wherein:
said scraper further comprises:
a second portion spaced from said first portion and said second portion in food removing relationship to said inside surface of said said bowl for removing food therefrom for the condition of said bowl rotating; and
said first portion and said second portion of said scraper positioned to scrape food into the spacing therebetween.

14. The arrangement defined in claim 1 and further comprising:
a cover member for covering said bowl and said covering member removably mountable on said base unit to cover said bowl.

15. An improved food processing arrangement comprising, in combination:
a mashing unit having:
a rotation producing means comprising:
a manually rotatable crank for rotation about a first axis;

a gear box operatively connected to said crank for transmitting rotary motion thereof;

having:

a pair of spaced apart rollers, a first of said pair of rollers operatively connected to said gear box for rotation thereby about a second axis;

a scraper means having a first scraper member in food removing relationship to said first of said pair of rollers for removing food from the outside surface of said first roller;

a base unit having:

a support surface;

a rigid framework extending upwardly from said support surface, and said mashing unit mounted on said rigid framework;

a bowl movably and detachably mountable on said base unit between said first of said pair of rollers and the second of said pair of rollers, and said bowl having:

an outside surface in tangential contact with said second of said pair of rollers;

an inside surface defining a food receiving cavity and said inside surface in tangential rotary motion transmitting contact with said first of said pair of rollers and in food mashing relationship to said first of said pair of rollers for the condition of said first of said pair of rollers rotating about said second axis;

said first of said pair of rollers rotating said bowl about a third axis at a predetermined rotational rate for the condition of said first of said pair of rollers rotating about said second axis, whereby food in said food receiving cavity of said bowl is mashed between said outside surface of said first of said pair of rollers and said inside surface of said bowl.

16. The arrangement defined in claim 15 wherein:

said outer surface of said first of said pair of rollers has a first portion and a second portion;

said first portion of said outer surface of said first of said pair of rollers having a first preselected curvature and said first preselected curvature selected to provide substantially tangential contact of said first portion of said first of said pair of rollers with said inside surface of said bowl; and said second portion of said outer surface of said first of said pair of rollers having a geometric configuration other than said first preselected curvature.

17. The arrangement defined in claim 16 wherein:

said geometric configuration of said second portion of said outer surface of said first of said pair of rollers is planar.

18. The arrangement defined in claim 15 wherein:

said scraper further comprises:

a second scraper member in food removing relationship to said inside surface of said bowl for removing food therefrom for the condition of said bowl rotating.

19. The arrangement defined in claim 15 wherein:

said second of said pair of rollers rotates about an axis that is substantially parallel to said second axis and spaced therefrom.

\* \* \* \* \*